United States Patent [19]
Hori

[11] Patent Number: 6,167,216
[45] Date of Patent: Dec. 26, 2000

[54] TEMPERATURE SENSOR AND TONER IMAGE FIXING DEVICE PROVIDED WITH SAID TEMPERATURE SENSOR

[75] Inventor: Hiroaki Hori, Soraku-gun, Japan

[73] Assignee: Sharp Kabushiki Kaisha, Osaka, Japan

[21] Appl. No.: 08/925,508

[22] Filed: Sep. 8, 1997

[30] Foreign Application Priority Data

Oct. 21, 1996 [JP] Japan ..................................... 8-276732

[51] Int. Cl.[7] ........................... G03G 15/20; G01K 13/06
[52] U.S. Cl. .............................................. 399/69; 374/153
[58] Field of Search ................................ 399/69, 328, 33; 374/153, 208; 219/216, 471; 432/60

[56] References Cited

U.S. PATENT DOCUMENTS

| 5,281,793 | 1/1994 | Gavin et al. ............................ 219/216 |
| 5,366,291 | 11/1994 | Nakagama et al. ...................... 374/153 |
| 5,765,075 | 6/1998 | Yamamoto .................................. 399/69 |

FOREIGN PATENT DOCUMENTS 1-51765  11/1989  Japan .

*Primary Examiner*—Joan Pendegrass
*Attorney, Agent, or Firm*—David G. Conlin; George W. Neuner; Dike, Bronstein, Roberts & Cushman LLP

[57] ABSTRACT

A prior art temperature sensing element by supporting plates against a fixing roller would detect a temperature lower than an actual surface temperature of the fixing roller, because said heat-conductive supporting plates would be cooled by air flowing along said supporting plate, depriving a part of its heat of the temperature sensing element through the supporting plate.

According to present invention, a heat-insulating elastic body is disposed over said two supporting plates at one end threof, said temperature sensing element is placed as being projecting from the surface of the heat-insulating elastic body at the center thereof, the temperature sensing element and supporting plates are fastened (sticked) with the heat-resisting film larger in length and wide than the heat-insulating elastic body and each having an adhesive surface one side thereof, and the other end of each supporting plate is secured to a holder.

5 Claims, 11 Drawing Sheets

TEMPERATURE SENSOR AND TONER IMAGE FIXING DEVICE PROVIDED WITH SAID TEMPERATURE SENSOR

BACKGROUND OF THE INVENTION

In a prior art temperature sensor, a temperature sensing element for detecting a temperature of a member to be heat-detected, e.g., a fixing roller of a fixing device is disposed between one end portion of two supporting plates made of stainless steel (SUS) for pressing said temperature sensing element against the fixing roller, said temperature sensing element and plates are fasten (sticked) together with heat-resistant films, each having an adhesive surface on one side thereof, while the other end portion of the supporting plates are secured to a holder.

In Japanese Laid-Open Patent Publication No. 1-51765, there is disclosed a toner-image fixing device comprising a resin sheet contacting with a surface of the member to be heat-detected (fixing roller), a heat-insulating elastic body for pressing said resin sheet against a surface of the fixing roller, and a temperature sensor with a temperature sensing element embedded in said heat-insulating elastic body to be pressed against said fixing roller.

The former (i.e., the temperature sensor), however, may detect a temperature lower than an actual surface temperature of a fixing roller because the supporting plates of a high thermal conductivity are cooled by air flowing therealong and the temperature sensing element contacting with the supporting plates may also be deprived a part of heat through the supporting plates.

In the latter (i.e., the toner-image fixing device), a temperature difference would appear between an actual surface temperature of the fixing roller and a detected temperature thereof, which would cause large ripples when controlling the temperature of said fixing roller to be constant, because the temperature sensing element is embedded in the heat-insulating elastic body, with a large contacting area thereof with the elastic body, whereby heat transferred to the fixing roller would be conducted to the elastic body.

SUMMARY OF THE INVENTION

The present invention relates to a temperature sensor comprising a temperature sensing element for detecting a temperature of a member to be heat-detected, said sensing element disposed between two supporting plates for pressing the temperature sensing element against the said member, and said supporting plates and temperature sensing element fastened together with heat-resistant films from both sides, each having an adhesive-coat on one side thereof, and more particularly to a sensor for detecting a surface temperature of a fixing roller of a toner-image fixing device for heat-fixing a toner-developed-image on a recording sheet.

The temperature sensor according to the present invention is directed to perform an accurate detection of a surface temperature of a member to be heat-detected without being influenced by air flow (wind) by interposing a heat-insulating elastic body between supporting plates and a temperature sensing element.

To realize the above-mentioned purpose, the present invention provides a temperature sensor and toner-image fixing devices, which are described as in the followings (1) to (5):

(1) There is provided a temperature sensor having a temperature sensing element for detecting a surface temperature of a member to be heat-detected and two supporting plates for placing said temperature sensing element and for pressing it against the surface of said member to be heat-detected, said temperature sensing element and said supporting plates fastened with heat-resisting film or films, each having an adhesive surface on oneside thereof, wherein a heat-insulating elastic body is interposed between said supporting plates and said temperature sensing element to place said temperature sensing element projecting therefrom at its top surface, and the supporting plates, the heat-insulating elastic member and the temperature sensing element are fastened together with said heat-resistant film or films.

(2) There is provided a fixing device having a fixing roller for heat fixing a toner-developed-image on paper to said paper wherein a heat-insulating elastic body is interposed between the temperature sensing element and the supporting plates pressing said temperature sensing element against said fixing roller, said temperature sensing element is placed which projects from the surface of said heat-insulating elastic body, said supporting plates, said heat insulating elastic body and said temperature sensing element are fastened together with said heat-resisting film or films to form said temperature sensor, and said temperature sensing element of said temperature sensor is pressed against the said fixing roller.

(3) There is provided a fixing device provided with a temperature sensor wherein, on the surface of said heat-insulating elastic body is paced a second heat-insulating elastic body for forming a protrusion smaller than said heat-insulating body, said temperature sensing element is placed on said second heat-insulating elastic body.

(4) There is provided a fixing device provided with a temperature sensor, wherein the supporting plates is formed to have a projecting center portion whereon the heat-insulating elastic body is placed.

(5) There is provided a fixing device provided with a temperature sensor as defined in claim 2, wherein the heat-insulating elastic member of the temperature sensor is formed to have a curved surface, whereon said temperature sensing element is placed at the top thereof.

PREFERRED EMBODIMENT OF THE INVENTION

Prior to an explanation of the present invention, a prior art temperature sensor and a fixing device with said temperature sensor will be described in the following for the purpose of understanding of the present invention.

In a prior art temperature sensor, a temperature sensing element 21 for detecting a temperature of a member to be heat-detected, e.g., a fixing roller of a fixing device is disposed between one end portion of two supporting plates 22 made of stainless steel (SUS) for pressing said temperature sensing element against the fixing roller, said temperature sensing element 21 and plates 22 are fastened (sticked) together with heat-resisting films 23 each having an adhesive surface on one side thereof, while the other end portion of the supporting plates 22 are secured to a holde 24.

In Japanese Laid-Open Patent Publication No. 1-51765, there is disclosed a toner-image fixing device comprising a resin sheet contacting with a surface of the member to be heat-detected(fixing roller), a heat-insulating elastic body for pressing said resin sheet against a surface of the fixing roller, and a temperature sensor with a temperature sensing element embedded in said heat-insulating elastic body to be pressed against said fixing roller.

The former (i.e., the temperature sensor), however, may detect a temperature lower than an actual surface temperature of a fixing roller because the supporting plates of a high thermal conductivity are cooled by air flowing thereamong and the temperature sensing element contacting with the supporting plates may also be deprived a part of heat through the supporting plates.

In the latter (i.e., the toner-image fixing device), a temperature difference may appear between an actual surface temperature of the fixing roller and a detected temperature thereof, which would cause large ripples when controlling the temperature of said fixing roller to be constant, because the temperature sensing element is embedded in the heat-insulating elastic body, with a large contacting area thereof with the elastic body, whereby heat transferred to the fixing roller would be conducted to the elastic body.

Figure 1:
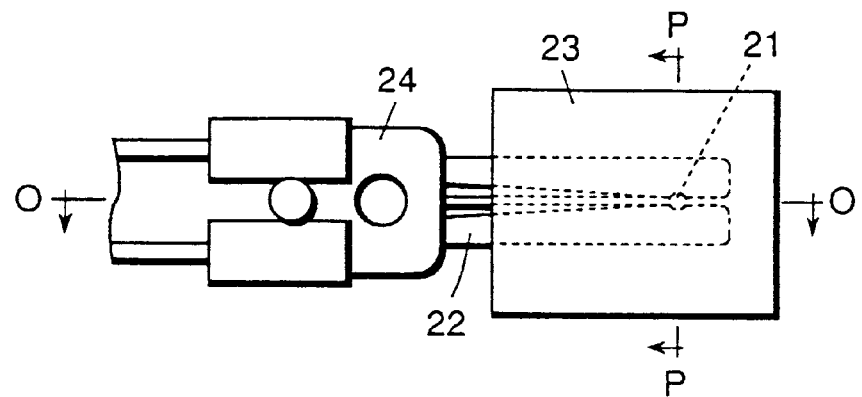
FIG. 1 is a plan view of a prior art temperature sensor.
Figure 2:
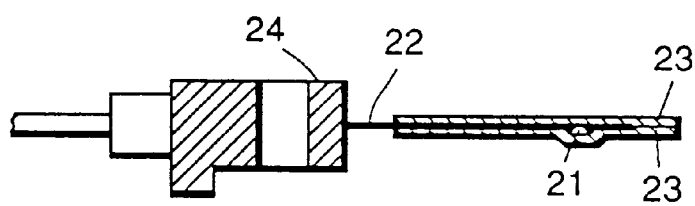
FIG. 2 is a sectional view taken along the plane O—O of FIG. 1.
Figure 3:
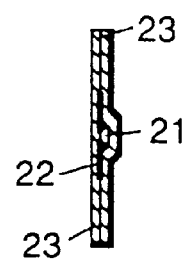
FIG. 3 is a sectional view taken along the plane P—P of FIG. 1.
Figure 4:
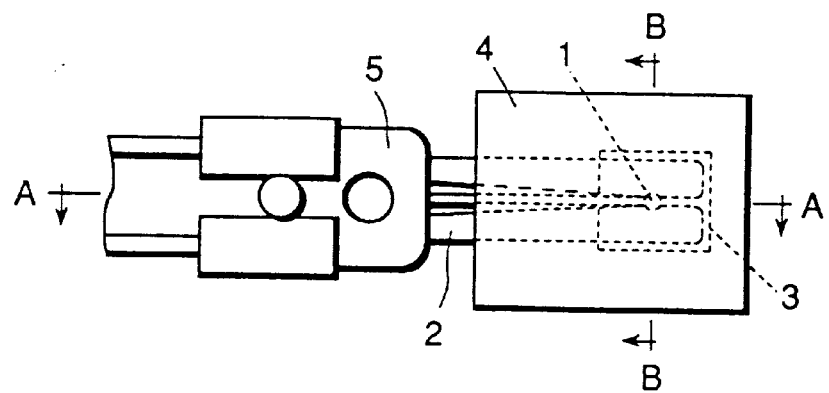
FIG. 4 is a plan view of a temperature sensor which is a first embodiment of the present invention.
Figure 5:
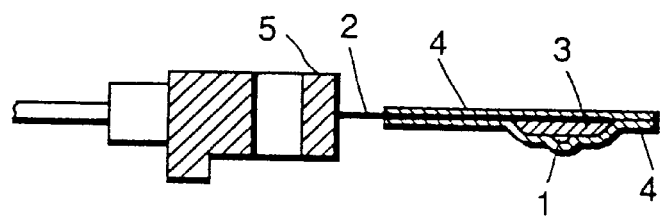
FIG. 5 is a sectional view taken along the plane A—A of FIG. 4.
Figure 6:
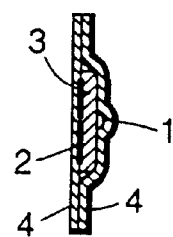
FIG. 6 is a sectional view taken along the plane B—B of FIG. 4.
Figure 7:
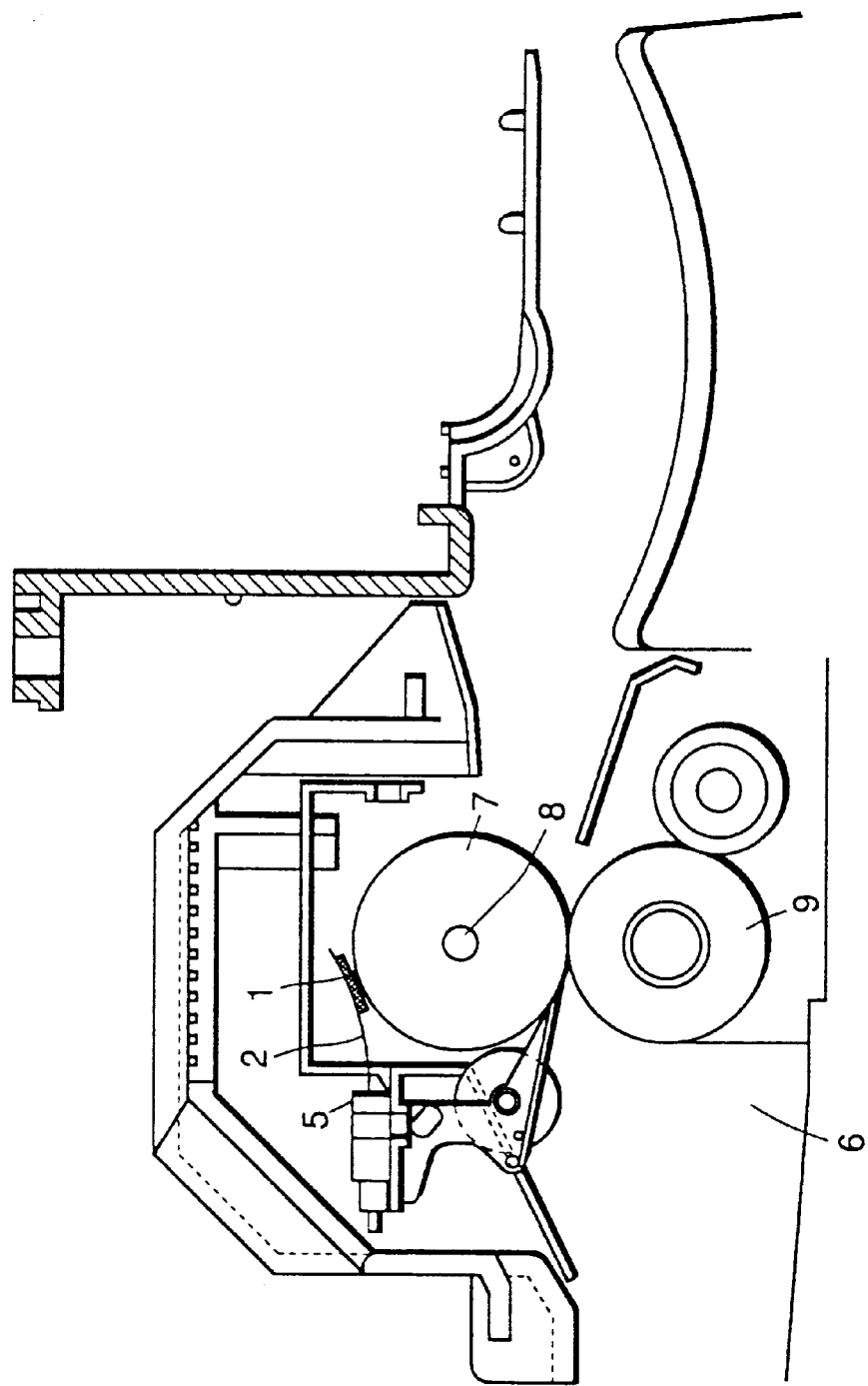
FIG. 7 is a sectional view of a toner-image fixing device provided with the temperature sensor according to first embodiment of the present invention.
Figure 8:
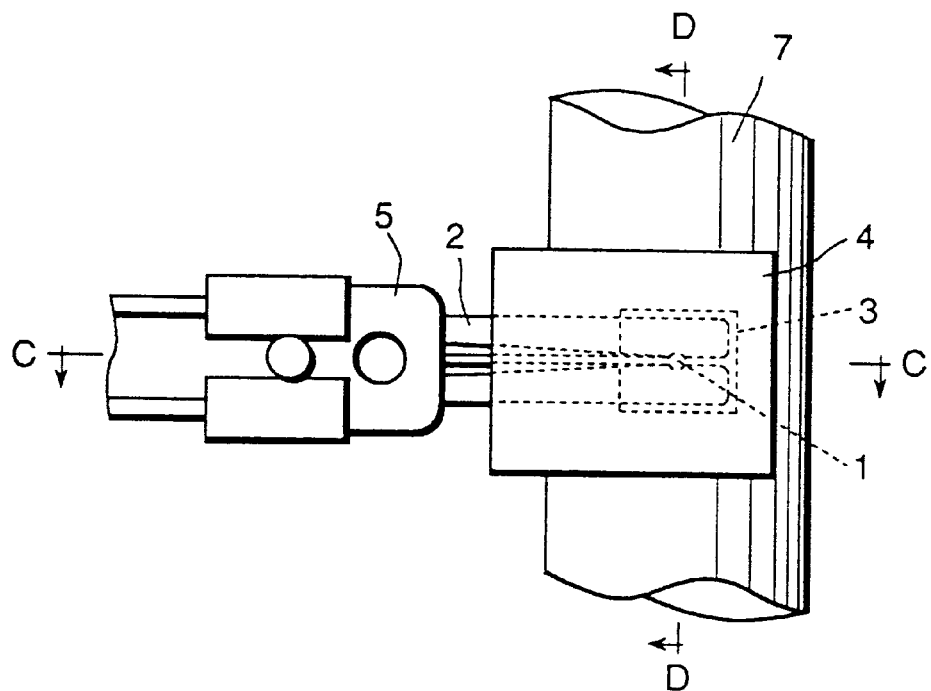
FIG. 8 is an enlarged plan view of an essential portion of FIG. 7.
Figure 9:
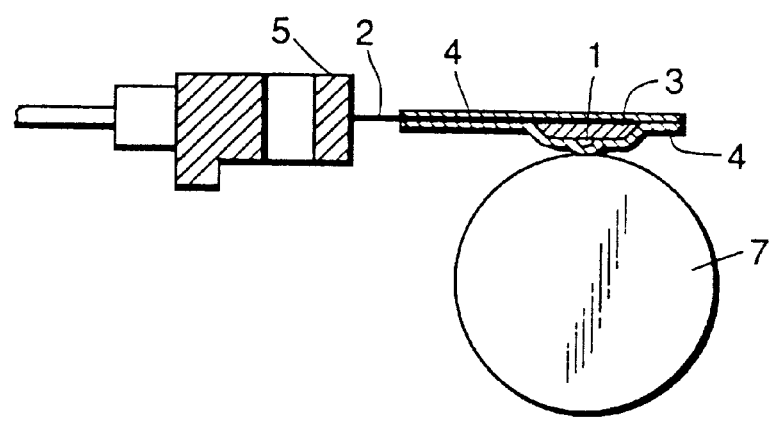
FIG. 9 is a sectional view taken along the plane C—C of FIG. 8.
Figure 10:
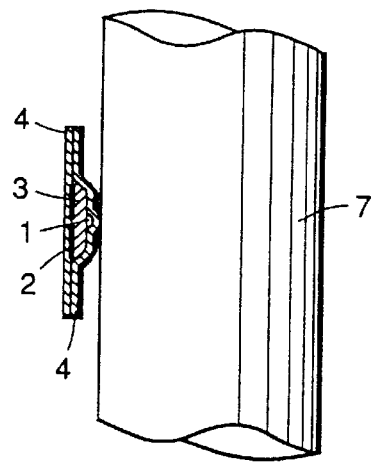
FIG. 10 is a sectional view taken along the plane D—D of FIG. 8.

Referring FIGS. 4 to 6, a temperature sensor according to a first embodiment of the present invention will be described as follows:

The temperature sensor according to the first embodiment of the present invention comprises: a temperature sensing element 1 for sensing a surface temperature of a member to be heat-detected e.g., a fixing roller (not shown) of a toner-image fixing device: two supporting plates 2 made of stainless steel (SUS304CSP) or bronze for pressing the sensing element 1 against the surface of the fixing roller; a heat-insulating elastic cubic body 3 made of a silicone rubber sponge or silicon rubber sheet disposed over one-end portion of the two supporting plates 2 and placing at its center the element 1 projecting therefrom; heat resisting films, such as polyimide or Teflon film 4, each with an adhesive surface on one side thereof, for fastening together the temperature sensing element 1, the supporting plates 2 and the heat-insulating elastic cubic body 3 by fastening them with their adhesive surfaces being larger in length and wide than the heat-insulating elastic cubic body 3; and a holder 5 for holding the other end portion of the two supporting plates 2.

As shown in FIGS. 7 to 10, this temperature sensor is pressed at its free end against the (fixing) heat roller 7 of the toner-image fixing device 6 to detect a surface temperature of the heat roller, thereby to control the temperature of the heat roller to be constant with respect to said detected temperature.

The heat roller 7 is made of aluminum or steel pipe and contains a halogen lamp 8 in its pipe body.

The toner-image fixing device 6 comprises a heat roller 7 and a pressure roller 9 covered with silicon rubber, whereby a paper carrying a toner-developed image thereon fed to the toner-image fixing device is suitably pressed by the pressure roller 9 and, at the same time, is adequately heated by the heat roller 7. to fix the toner-image on the paper by fusing.

With said construction, only the temperature sensing element 1 projecting from the heat-insulating elastic member 3 is pressed against the heat roller through the heat-resistant film 4, with keeping off the heat-insulating elastic body 3 from the heat roller 7, whereby the temperature sensor may accurately detect the surface temperature of the heat roller 7. Thus the surface temperature of its heat roller may be controlled to be constant without causing any ripple.

The heat-insulating elastic body 3 interposed between the supporting plates 2 and the temperature sensing element 1 can minimize the heat loss from the supporting plates caused by air flowing along the both sides of the sensor. Thus, the temperature sensor may reliably detect the actual surface temperature of the heat roller 7.

Figure 11:
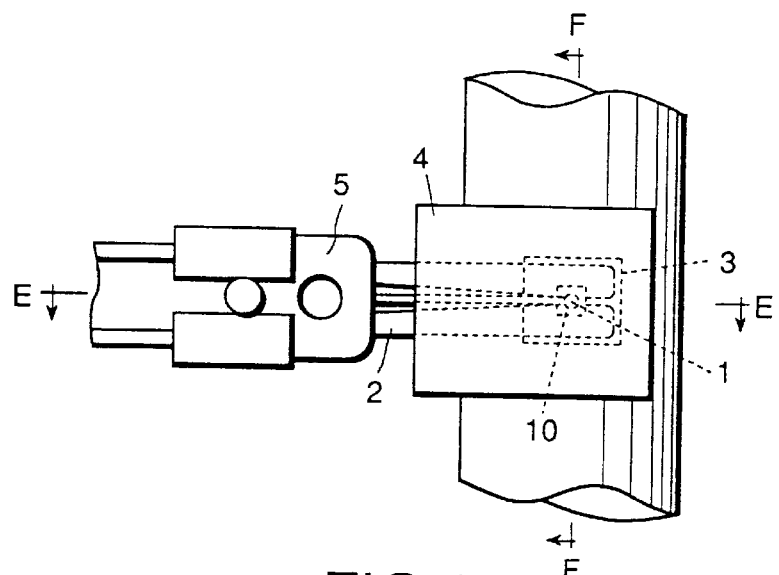
FIG. 11 is a sectional view of a toner-image fixing device provided with the temperature sensor according to a second embodiment of the present invention.
Figure 12:
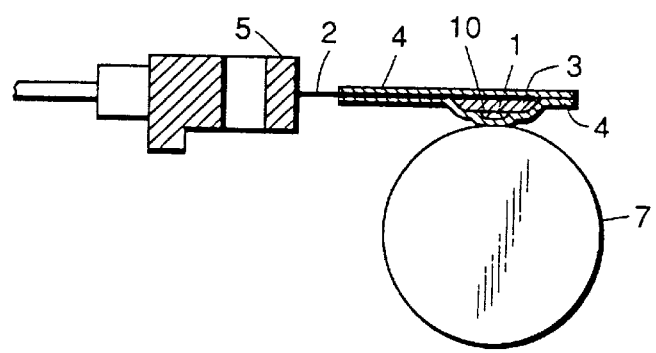
FIG. 12 is a sectional view taken along the plane E—E of FIG. 11.
Figure 13:
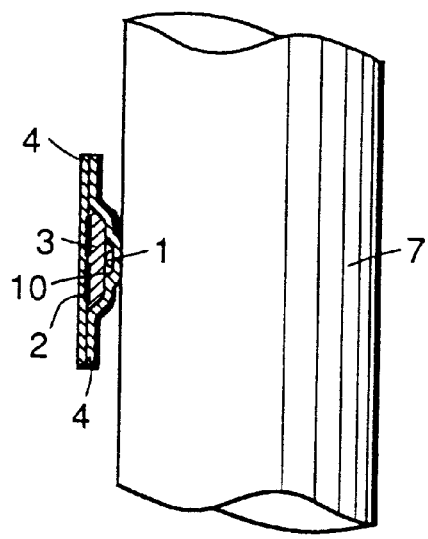
FIG. 13 is a sectional view taken along the plane F—F of FIG. 11.

Referring to FIGS. 11 to 13, a toner-image fixing device with a temperature sensor according to a second embodiment of the present invention will be described as follows:

In this embodiment, a second heat-insulating body 10 formed as a protrusion smaller than the heat-insulating elastic body 3 is disposed on the surface on said heat-insulating body, the temperature sensing element is disposed on the second heat-insulating member, and the supporting plates, heat-insulating elastic body 3, the second heat-insulating body 10 are fastened with heat-resisting films 4 larger in length and wide than the heat-insulating elastic body 3, with pressing the temperature sensor against the heat roller.

With said construction, the temperature sensor project further distance from the first elastic body than as in the case with the first embodiment by virtue of the second heat-insulating elastic member 10, whereby the temperature sensing element 1 may make a point contact with the heat roller 7, thus eliminating adhesion of toner particles to the heat-resisting film 4, any fed paper would surely be mavented from being contaminated with toner particles collected and adhered on the surface of the heat roller, transferred from the contacting surface of the heat-resisting film with the heat roller thereto.

Figure 14:
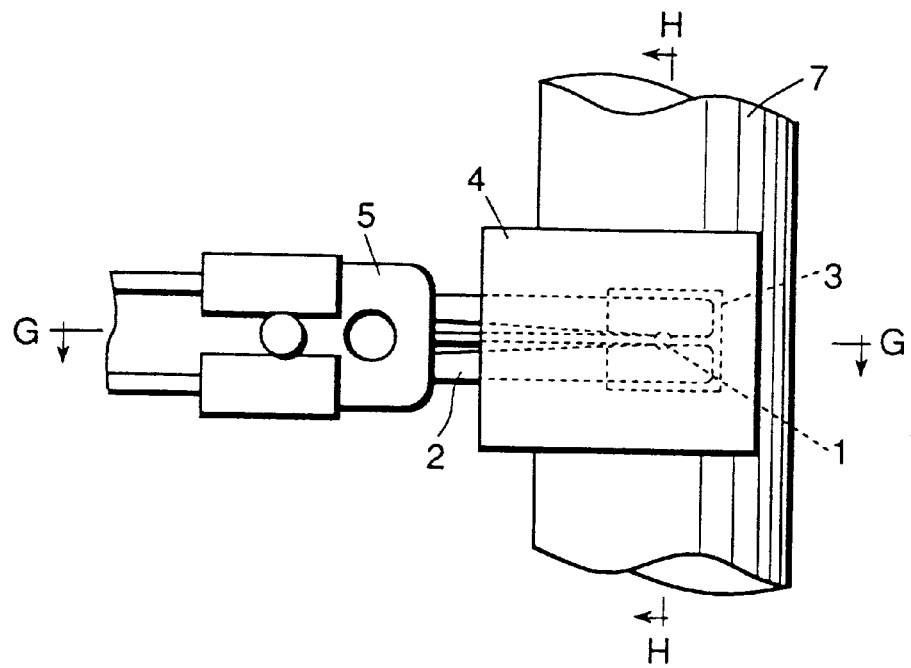
FIG. 14 is a sectional view of a toner-image fixing device provided with the temperature sensor according to a third embodiment of the present invention.
Figure 15:
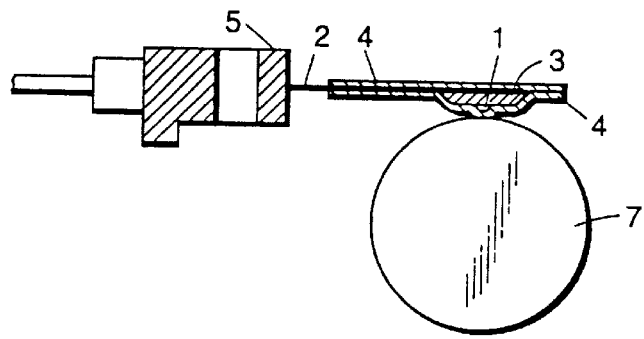
FIG. 15 is a sectional view taken along the plane G—G of FIG. 14.
Figure 16:
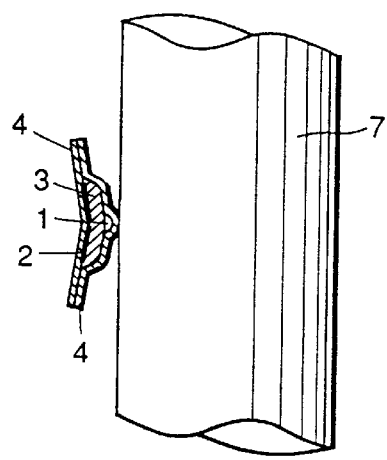
FIG. 16 is a sectional view taken along the plane H—H of FIG. 14.

Referring to FIGS. 14 to 16, a toner-image fixing device provided with a temperature sensor according to a third embodiment of the present invention will be described as follows:

Two supporting plates 2 are arranged diagonally to form a V-shaped support in side view. A heat-insulating elastic body 3 is disposed at a ridge of the V-shaped supports and holds at its center a temperature sensing element 1. The temperature sensing element 1, supporting plates 2, heat-insulating elastic body 3 are fastened (stacked) together with the heat-resisting film 4 being larger in length and wide than said heat-insulating elastic body 3, the temperature sensor assembly is pressed against the heat roller 7 of the fixing device.

With said construction, the above-mentioned temperature sensor with V-shaped support allows the temperature sensing element 1 to project further distance to make a point contact with the heat roller 7, thus eliminating the possibility of contamination of the heat-resistant film 4 with toner, any fed paper would surely be prevented from being contaminated with toner particles collected and adhered on the surface of the heat roller, transferred from the contacting surface of the heat-resisting film with the heat roller thereto, the temperature sensing element can be formed to project by the V-shaped arrangement of two supporting plates without using any additional part.

Figure 17:
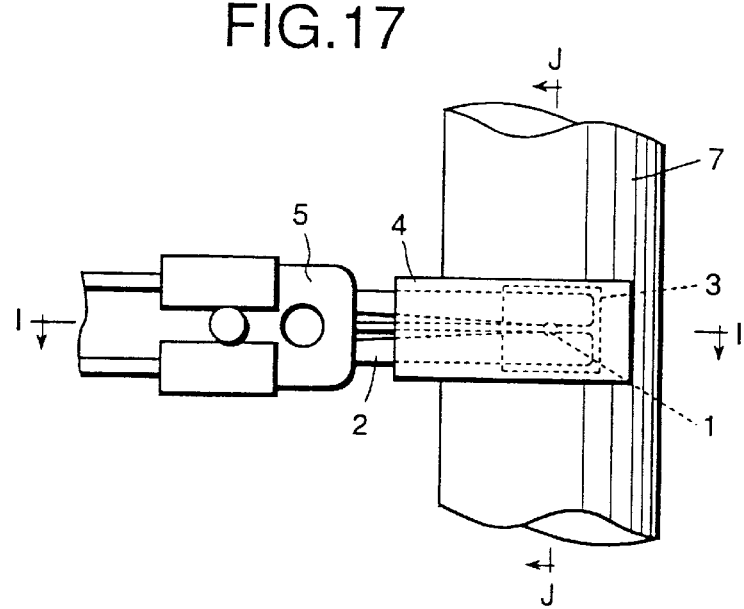
FIG. 17 is a sectional view of a toner-image fixing device provided with the temperature sensor according to a fourth embodiment of the present invention.
Figure 18:
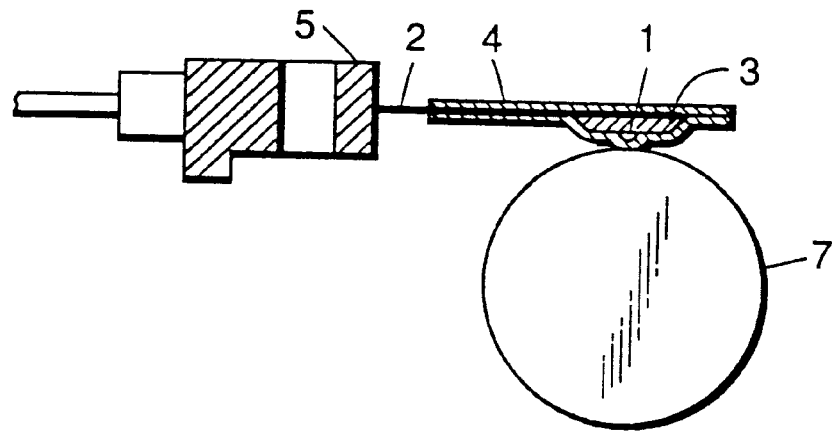
FIG. 18 is a sectional view taken along the plane I—I of FIG. 17.
Figure 19:
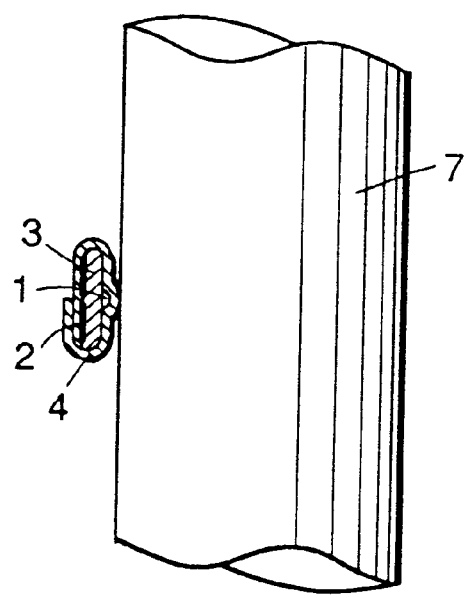
FIG. 19 is a sectional view taken along the plane J—J of FIG. 17.

Referring to FIGS. 17 to 19, a toner-image fixing device provided with a temperature sensor according to a fourth embodiment of the present invention will be described as follows:

A temperature sensing element 1, supporting plates 2 and a heat-insulating elastic member 3 are wrapped together by one sheet of heat-resisting film 4 to form a temperature sensor to be pressed against the heat roller 7 of the toner fixing device.

With the above construction, the temperature sensor thus constructed is compact and requires a reduced space to mount.

Figure 20:
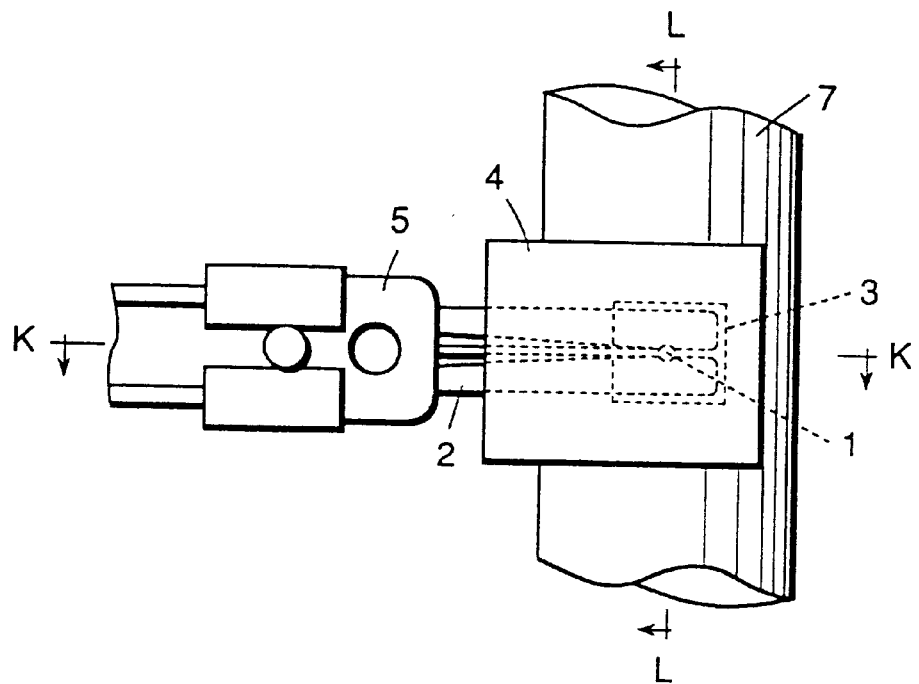
FIG. 20 is a sectional view of a toner-image fixing device provided with the temperature sensor according to a fifth embodiment of the present invention.
Figure 21:
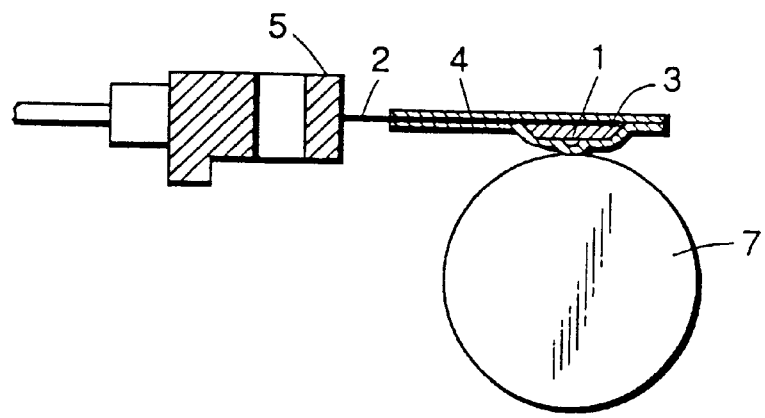
FIG. 21 is a sectional view taken along the plane K—K of FIG. 20.
Figure 22:
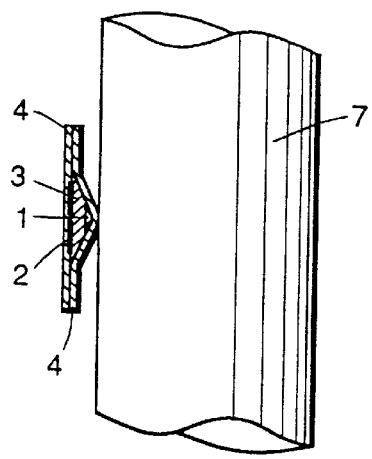
FIG. 22 is a sectional view taken along 'the plane L—L of FIG. 20.

Referring to FIGS. 20 to 22, a toner-image fixing device with a temperature sensor according to a fifth embodiment of the present invention will be described as follows:

The surface of the heat-insulating body on which the temperature sensing element 1 is to be placed is formed as curved, a temperature sensing element 1 is placed at the curved top-surface of a heat-insulating body 3 mounted on supporting plates 2, the temperature sensing element 1, the supporting plates 2 and the heat-insulating body 3 are fastened together from both sides with heat-resistant films 4 having a surface larger in length and wide than the heat-insulating elastic body 3. the temperature sensor is pressed against the heat roller 7 of a toner image fixing device.

With said construction, the temperature sensor, with a curved surface of the heat-insulating elastic member 3, may project further distance from the first elastic body than as in the case with the first embodiment, whereby the temperature sensing element 1 may make a point contact with the heat roller 7, thus eliminating adhesion of toner particles to the heat-resistant film 4, any fed paper would be surely prevented from being contaminated with toner particles, collected and adhered on the surface of the heat roller, transferred from the contacting surface of the heat-resisting film with the heat roller thereto.

Figure 23:
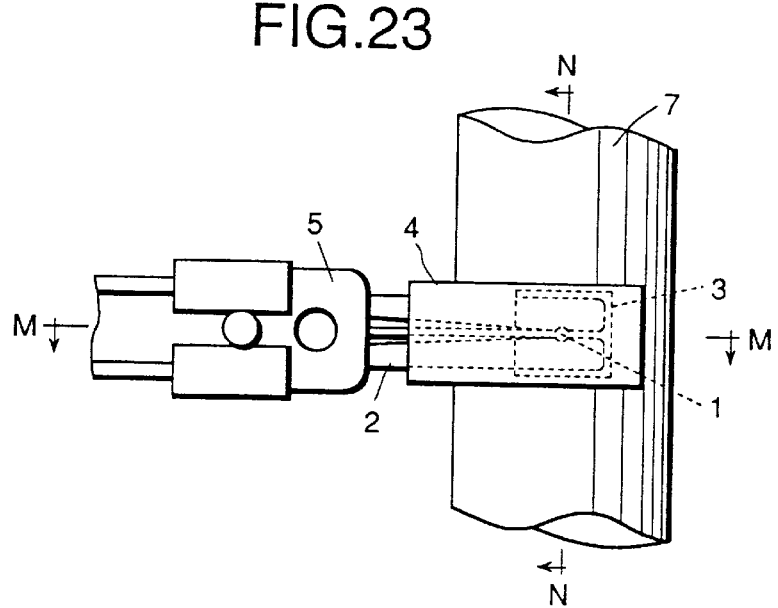
FIG. 23 is a sectional view of a toner-image fixing device provided with the temperature sensor according to a sixth embodiment of the present invention.
Figure 24:
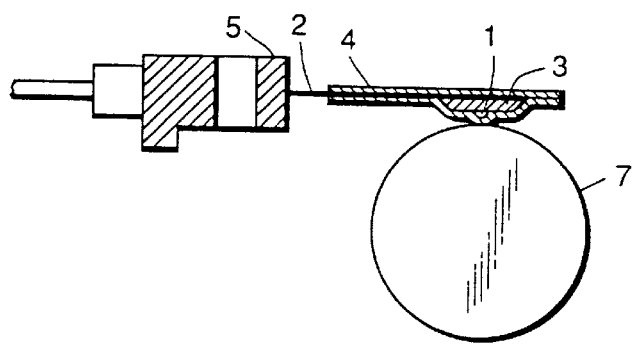
FIG. 24 is a sectional view taken along the plane M—M of FIG. 23.
Figure 25:
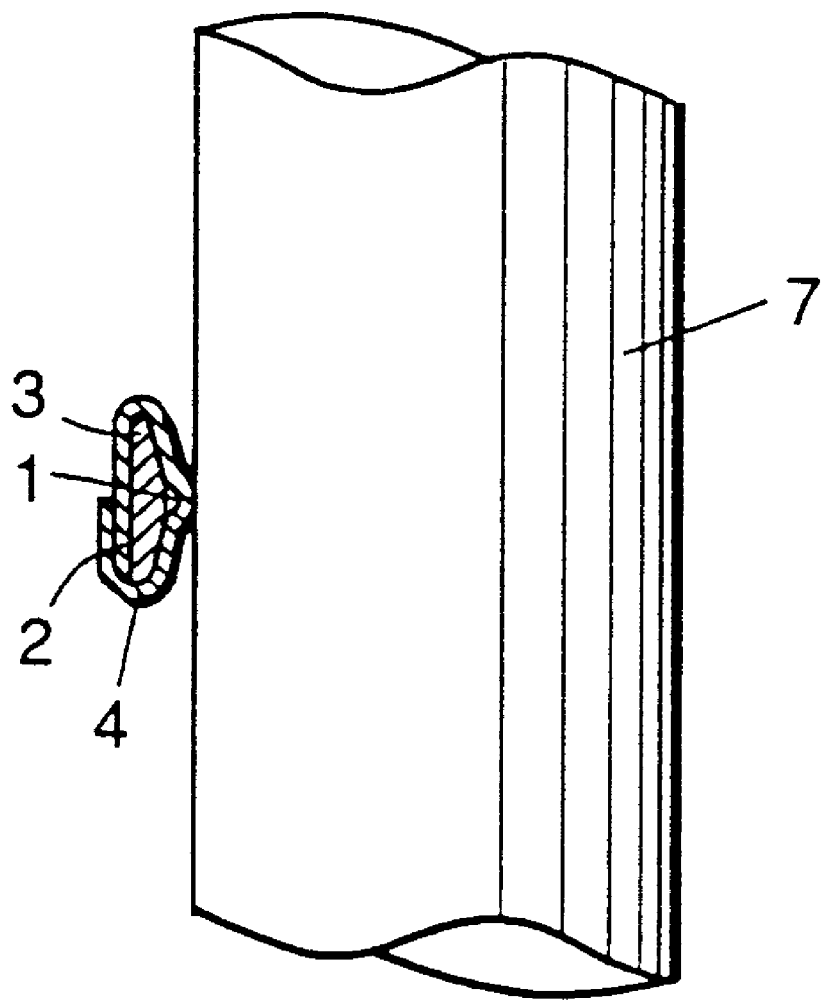
FIG. 25 is a sectional view taken along the plane N—N of FIG. 23.

Referring to FIGS. 23 to 25, a toner-image fixing device provided with a temperature sensor according to a sixth embodiment of the present invention will be described as follows:

The surface of the heat-insulating body on which the temperature sensing element 1 is to be placed is formed as curved, a temperature sensing element 1 is mounted at the top of a curved surface of a heat-insulating body 3 placed on supports 2, a temperature sensing element 1, supporting plates 2 and a heat-insulating elastic member 3 are wrapped together by one sheet of heat-resisting film 4 to form a temperature sensor to be pressed against the heat roller 7 of the toner fixing device.

With said construction, the temperature sensor, with a curved surface of the heat-insulating elastic member 3, would project further distance from the elastic body than as in the case with the first embodiment, whereby the temperature sensing element 1 may make a point contact with the heat roller 7, thus eliminating adhesion of toner particles to the heat-resistant film 4, any fed paper would surely be prevented paper from being contaminated with toner particles collected and adhered on the surface of the heat roller, transferred from the contacting surface of the heat-resisting film 4 (temperature sensing) element, with the heat roller thereto.

The temperature sensing element can be formed to project by the arrangement of the supporting plates when assembled, without using any additional part.

The temperature sensor may also be made compact and mounted within a limited space.

A temperature sensor defined in claim 1 has a heat-insulating elastic body interposed between two supporting plates and a temperature sensing element, thus eliminating the heat loss from the supporting plates caused by air flowing along the both sides of the sensor. Accordingly, the temperature sensor can accurately detect the actual surface temperature of an object.

In a toner-image fixing device provided with a temperature sensor defined in claim 2, since only a temperature sensing element projects from the surface of the heat-insulating elastic body thereby be pressed against the surface of a heat roller through the heat resisting film, the heat-insulating elastic body may kept off from the heat roller, the temperature sensor can accurately sense the surface temperature of the heat roller. whereby the surface temperature of its heat roller would be controlled accurately to be constant without any ripple.

Since the heat-insulating elastic body interposed between supporting plates and a temperature sensing element can eliminate the drawback of heat loss from the supporting plates by air flowing along the both sides of the sensor. the temperature sensor can accurately measure the actual surface temperature of the heat roller.

In a toner-image fixing device provided with a temperature sensor according to claim 3, a temperature sensing element may project further distance by virtue of a second heat insulating body to make a point contact with the heat roller, thus eliminating the adhesion of toner particles to the heat-resistant film, any fed paper would surely be prevented from being contaminated with toner particles collected and adhered on the surface of the heat roller, transferred from the contacting surface of the heat-resisting film with the heat roller thereto.

In a toner-image fixing device provided with a temperature sensor according to claim 4, a temperature sensing element may project further distance by virtue of the shape of the supporting plates to make a point contact with a heat roller, thus eliminating adhesion of toner particles to the heat-resistant film, any fed paper would surely be prevented from being contaminated with toner particles collected and adhered on the surface of the heat roller 7, transferred from the contacting surface of the heat-resisting film with the heat roller thereto.

The temperature sensing element can be formed to project by the shape of the supporting plates when assembled, without using any additional part.

In a toner-image fixing device provided with a temperature sensor according to claim 5, a temperature sensing element may project further distance by virtue of the curved surface of the heat-insulating elastic body on which the temperature sensing element is to be arranged, to make a point contact with the heat roller, thus eliminating the adhesion of toner particles to the heat-resistant film, any fed paper would surely be prevented from being contaminated with toner particles collected and adhered on the surface of the heat roller, transferred from the contacting surface of the heat-resisting film with the heat roller thereto. The temperature sensing element may be formed to project by the shape of the heat-insulating elastic body without using any additional part.

What is claimed is:

1. A fixing device having (A) a fixing roller for heat fixing to a paper a toner-developed-image on said paper and (B) a temperature sensor, said temperature sensor comprising (1) a temperature sensing element for detecting a surface temperature of a body to be detected and (2) two supporting plates for placing said temperature sensing element and for pressing it against the surface of said body to be heat detected; said temperature sensing element and said supporting plates fastened with heat resisting film or films, each film having an adhesive surface on one side thereof; wherein a heat-insulating elastic body is interposed between said supporting plates and said temperature sensing element to place said temperature sensing element projecting therefrom at its top surface; and the supporting plates, the heat insulating elastic body and the temperature sensing element are fastened together with said heat-resistant film or films, wherein, on the surface of said heat insulating elastic body is placed a second heat insulating elastic body for forming a protrusion smaller than said heat-insulating elastic body, and said temperature sensing element is placed on said second heat insulating elastic body.

2. A fixing device as set forth in claim 1, wherein the heat-insulating elastic body of the temperature sensor is formed to have curved surface having a top portion, whereon said temperature sensing element is placed at the top portion thereof.

3. A fixing device having (A) a fixing roller for heat fixing to a paper a toner-developed-image on said paper and (B) a temperature sensor, said temperature sensor comprising (1) a temperature sensing element for detecting a surface temperature of a body to be detected and (2) two supporting plates for placing said temperature sensing element and for pressing it against the surface of said body to be heat detected; said temperature sensing element and said supporting plates fastened with heat resisting film or films, each film having an adhesive surface on one side thereof; wherein a heat-insulating elastic body is interposed between said supporting plates and said temperature sensing element to place said temperature sensing element projecting therefrom at its top surface; and the supporting plates, the heat insulating elastic body and the temperature sensing element are fastened together with said heat-resistant film or films, wherein one of the supporting plates is formed to have a projecting center portion whereon the heat-insulating body is placed.

4. A fixing device as set forth in claim 3, wherein the heat-insulating elastic body of the temperature sensor is formed to have curved surface having a top portion, whereon said temperature sensing element is placed at the top portion thereof.

5. A fixing device having (A) a fixing roller for heat fixing to a paper a toner-developed-image on said paper and (B) a temperature sensor, said temperature sensor comprising (1) a temperature sensing element for detecting a surface temperature of a body to be detected and (2) two supporting plates for placing said temperature sensing element and for pressing it against the surface of said body to be heat detected; said temperature sensing element and said supporting plates fastened with heat resisting film or films, each film having an adhesive surface on one side thereof; wherein a heat-insulating elastic body is interposed between said supporting plates and said temperature sensing element to place said temperature sensing element projecting therefrom at its top surface; and the supporting plates, the heat insulating elastic body and the temperature sensing element are fastened together with said heat-resistant film or films, wherein the heat-insulating elastic body of the temperature sensor is formed to have curved surface having a top portion, whereon said temperature sensing element is placed at the top portion thereof.

* * * * *